US012205410B2

(12) United States Patent
Igrec et al.

(10) Patent No.: US 12,205,410 B2
(45) Date of Patent: Jan. 21, 2025

(54) SYSTEM AND MULTI-FUNCTIONAL WIRELESS COMMUNICATION DEVICE FOR ACCESS CONTROL AND TICKET VALIDATION

(71) Applicant: Margento R&D d.o.o., Maribor (SI)

(72) Inventors: Dalibor Igrec, Maribor (SI); Gregor Golobich, Portoroz (SI); Milosh Urbanija, Izlake (SI)

(73) Assignee: Margento R&Dd.o.o., Maribor (SI)

( * ) Notice: Subject to any disclaimer, the term of this patent is extended or adjusted under 35 U.S.C. 154(b) by 0 days.

(21) Appl. No.: 18/142,082

(22) Filed: May 2, 2023

(65) Prior Publication Data

US 2024/0371208 A1 Nov. 7, 2024

(51) Int. Cl.
*G07B 11/00* (2006.01)
*G07B 15/00* (2011.01)

(52) U.S. Cl.
CPC .............. *G07B 11/00* (2013.01); *G07B 15/00* (2013.01)

(58) Field of Classification Search
CPC ......... G07B 11/00; G07B 15/00; G06K 19/00
USPC ......................................... 235/384, 382, 375
See application file for complete search history.

(56) References Cited

U.S. PATENT DOCUMENTS

2013/0173316 A1* 7/2013 Agrawal ............ G06Q 20/0457 705/5
2013/0243189 A1* 9/2013 Ekberg .................. H04L 63/123 380/44
2015/0271631 A1* 9/2015 Porter ...................... H04W 4/02 455/456.3
2015/0317853 A1* 11/2015 Reymann ................. G07C 9/20 340/5.7
2017/0301160 A1* 10/2017 Somani .................. G07B 15/00
2019/0335325 A1* 10/2019 Vagelos ................ H04W 12/37
2020/0126058 A1 4/2020 Mars et al.

FOREIGN PATENT DOCUMENTS

EP 3944588 A1 1/2022

OTHER PUBLICATIONS

Neumann, Christoph; European Search Report re: German Pat. Appln. No. 23171053.4-1009; Oct. 2, 2023; 13 pages; Munich, Germany.
Neumann, Christoph; Communication pursuant to Article 94(3) EPC re: EP Appln. No. 23 171 053.4-1009; Jun. 28, 2024; 7 pages; European Patent Office; Rijswijk, Netherlands.

* cited by examiner

*Primary Examiner* — Edwyn Labaze
(74) *Attorney, Agent, or Firm* — Rogue.law; Laura Schneider

(57) ABSTRACT

A multi-functional wireless communication device for access control and ticket validation, has a housing, a processing unit for managing the operations and functionalities of the device, communication modules, including Bluetooth, NFC, RF, and UWB modules for wireless communication with various external devices, such as terminals and access control systems. The exemplary device has a secure element for securely storing sensitive information and cryptographic keys, e. a haptic element for providing user feedback during device operation, protected flash memory for storing data and device settings, a speaker for outputting audible feedback, a visualization element for providing visual feedback, a battery for providing power to the device, and a button for initiating ticket validation or access control operations.

13 Claims, 2 Drawing Sheets

SYSTEM AND MULTI-FUNCTIONAL WIRELESS COMMUNICATION DEVICE FOR ACCESS CONTROL AND TICKET VALIDATION

FIELD OF THE INVENTION

The present invention generally relates to wireless communication devices and, more specifically, to a multi-functional wireless communication device.

BACKGROUND OF THE INVENTION

Access control and ticket validation systems have increasingly adopted wireless communication technologies to improve user convenience and system efficiency in recent years. Traditional approaches often require physical interaction, such as swiping a card, inserting a coin, or manually opening a gate. These methods can be time-consuming and prone to wear and tear on the user's access device and the system's infrastructure. Furthermore, users often need multiple devices or cards to access various services, adding to the inconvenience and clutter.

Existing solutions, such as smartphones with NFC capabilities, have addressed issues by consolidating various access control and ticket validation functions into a single device. However, these solutions often rely on complex, power-hungry components, such as large LCD screens, cameras, and mobile communication modules, limiting the device's battery life and overall durability. Additionally, these solutions may only suit some users or situations, as they can be expensive and require a constant internet connection to function correctly.

SUMMARY

An exemplary multi-functional wireless communication device for access control and ticket validation, has a housing, a processing unit for managing the operations and functionalities of the device, communication modules, including Bluetooth, NFC, RF, and UWB modules for wireless communication with various external devices, such as terminals and access control systems. The exemplary device has a secure element for securely storing sensitive information and cryptographic keys, e. a haptic element for providing user feedback during device operation, protected flash memory for storing data and device settings, a speaker for outputting audible feedback, a visualization element for providing visual feedback, a battery for providing power to the device, and a button for initiating ticket validation or access control operations.

BRIEF DESCRIPTION OF THE FIGURES

The present invention may be more clearly understood by referring to the following figures and further details of the following inventions.

DETAILED DESCRIPTION OF THE INVENTION

Figure 1:
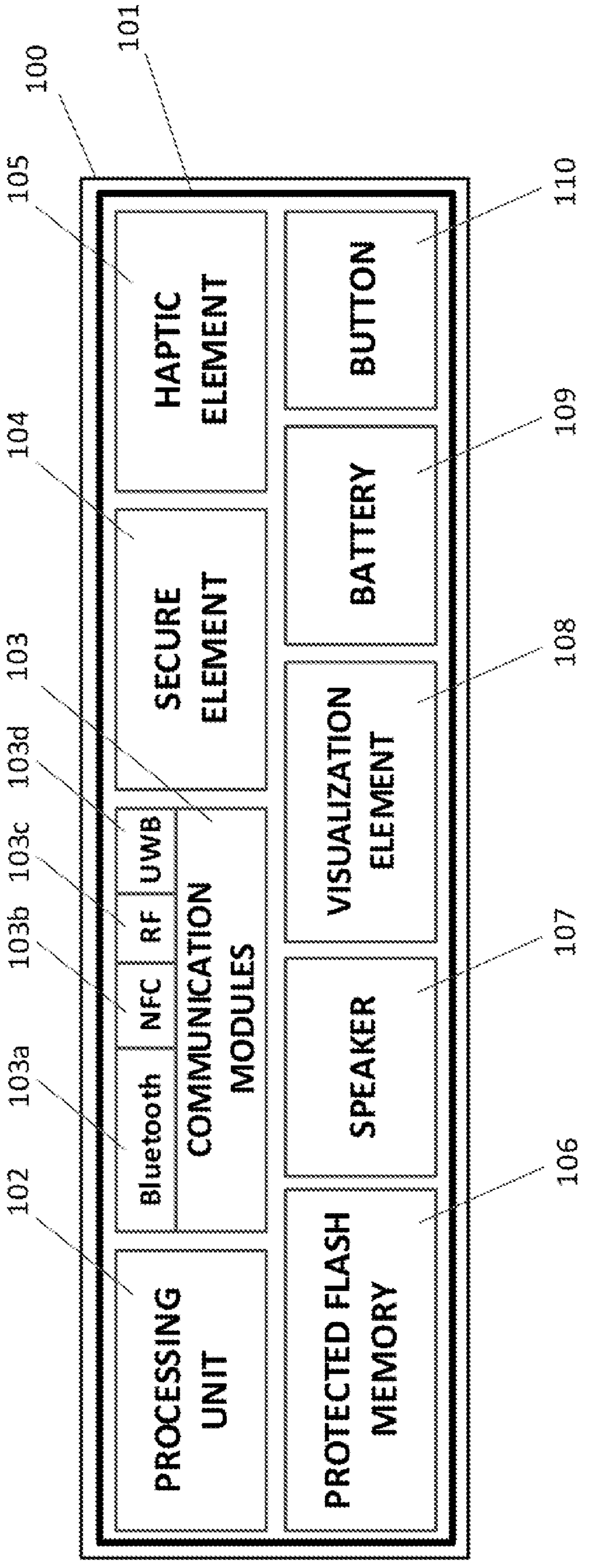
FIG. 1 is a schematic of the Multi-Functional Wireless Communication Device components.
Figure 2:
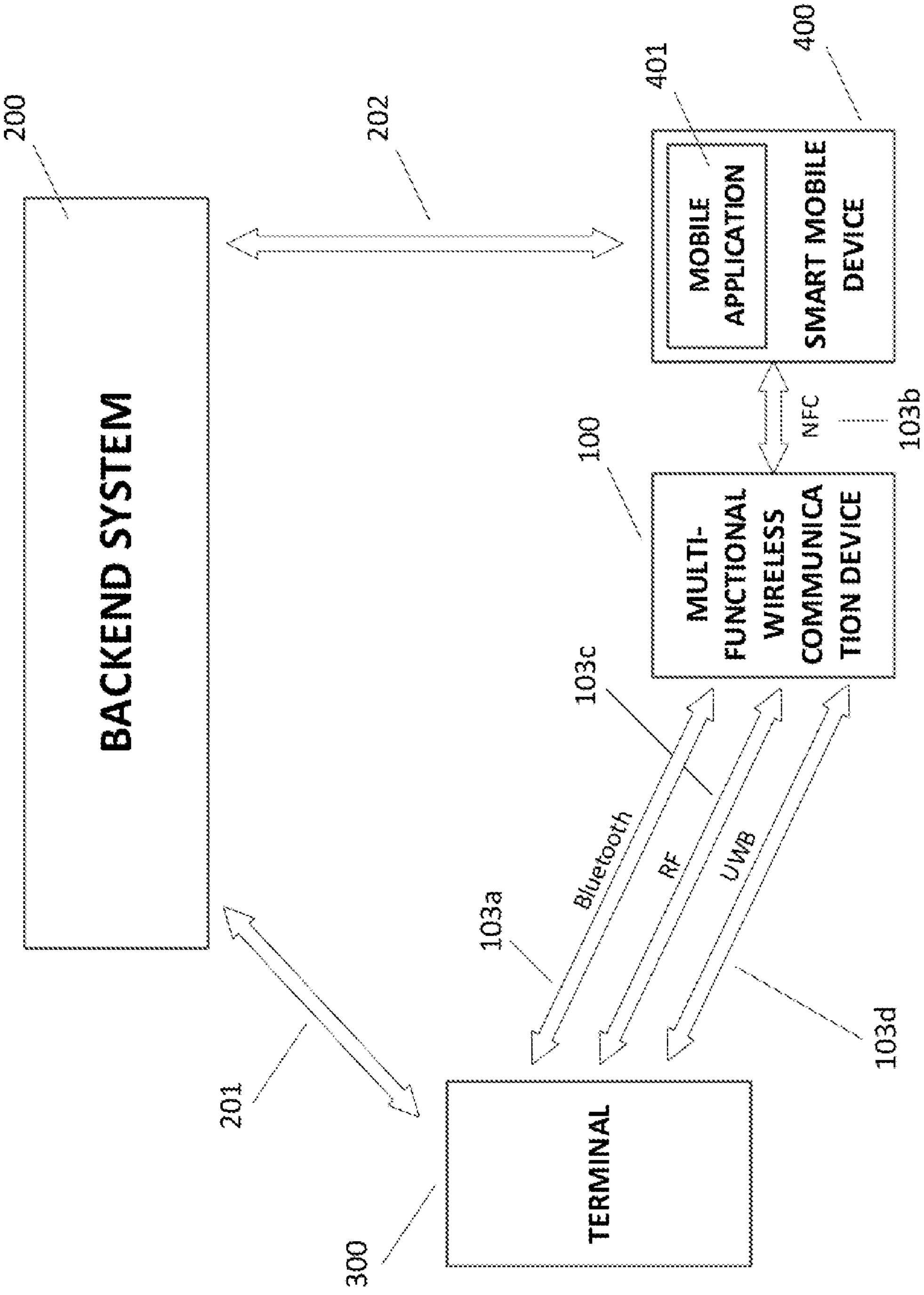
FIG. 2 is a schematic of the entire system for the Multi-Functional Wireless Communication Device for Access Control and Ticket Validation.

The present invention relates to a system and a multi-functional wireless communication device for access control and ticket validation. Specifically, the invention aims to provide a robust, easy-to-use device that combines the functionality of a ticket terminal, access control key, and remote control for various applications, such as public transportation, parking, and garage door opening. The device communicates with a backend system and a terminal, allowing for secure and efficient validation and access control processes.

The present invention aims to overcome the limitations of existing access control and ticket validation systems by providing a multi-functional wireless communication device and an accompanying strategy that enables efficient and secure validation and access control processes. The multi-functional wireless communication device comprises a substantially closed, protective and robust housing, a processing unit, communication modules (including Bluetooth, NFC, RF, and UWB), a secure element, a haptic element, protected flash memory, a speaker, a visualization element, a battery, and a button for initiating validation or access control operations.

The system includes a backend system for processing validations and access control requests in real time, a terminal connected to the backend system for verifying the authenticity of the requests, and a mobile application on a smart mobile device connected to the backend system, allowing users to top-up or change parameters on the multi-functional wireless communication device via NFC. The system can operate online and offline, providing flexibility and reliability in various usage scenarios.

The invention provides a user-friendly, cost-effective, and versatile access control and ticket validation solution, reducing the need for multiple devices or cards and streamlining the user experience. The multi-functional wireless communication device is designed to be robust and easy to use, making it suitable for a wide range of users and applications.

The inventors first developed systems that include a terminal and a smart mobile device, allowing for wireless ticket validation on buses, wireless parking validation, raising the parking ramp, garage door opening, and similar functions, are as follows:

- Mobile Ticketing and Validation: Many public transportation systems have adopted mobile ticketing, where users can purchase tickets through a dedicated application or mobile website. These digital tickets can be validated using QR codes, barcodes, or NFC technology by bringing the smart mobile device close to a terminal.
- Contactless Payment Systems: Apple Pay, Google Pay, and Samsung Pay have become widely used for contactless payments, including public transportation and parking. These systems use NFC technology to secure transactions between a user's smart mobile device and a terminal.
- Smartphone Garage Door Openers: There are smart garage door openers that can be controlled via a smartphone application through Bluetooth, Wi-Fi, or other wireless protocols. Users can open and close their garage doors remotely and, in some cases, even grant temporary access to other users.
- Access Control Systems: Modern access control systems often integrate smart mobile devices as an authentication method, using Bluetooth, NFC, or other wireless technologies. Users can unlock doors, gates, or ramps by presenting their smart mobile device to a terminal, which verifies the user's identity and grants access.
- Mobile Parking Solutions: Some parking management systems have implemented mobile applications to facilitate parking payments and validation. Users can pay for parking through the application, which communicates with a terminal to confirm payment and grant access.

While significant advancements have been made in integrating smart mobile devices into various validation and access control systems, the inventors found that there is still room for improvement and innovation, particularly in combining multiple functions into a seamless user experience. Newer technologies like UWB and the continued development of existing technologies like Bluetooth and NFC may open further possibilities for more versatile, secure, and user-friendly systems.

Several drawbacks to the above described systems include a terminal and a smart mobile device, allowing for wireless ticket validation on buses, parking validation, ramp lifting, garage door opening, and similar functions. Some of these shortcomings include the following:

- Fragmentation: Many existing systems require separate applications or platforms for different functions, such as public transportation, parking, or access control. This fragmentation can lead to a cumbersome user experience and require users to manage multiple accounts, applications, or credentials.
- Compatibility Issues: Some systems may not be compatible with all types of smartphones or operating systems, limiting their accessibility and usability. In addition, certain terminals may only work with specific wireless technologies, leading to further compatibility challenges.
- Connectivity Reliability: Wireless communication technologies, such as Bluetooth or Wi-Fi, can be susceptible to interference or signal loss, which can impact the performance and reliability of the system. Additionally, reliance on mobile data or Wi-Fi connectivity can lead to potential issues in areas with the poor network coverage.
- Security Concerns: Wireless communication can expose systems to vulnerabilities such as unauthorized access or data breaches. While technologies like NFC offer higher security, no system is entirely immune to potential risks.
- Power Consumption: The use of wireless communication technologies can consume a significant amount of power on smart mobile devices, leading to shorter battery life and potentially inconveniencing users.
- Cost: Implementing and maintaining a wireless validation system can be costly, particularly for small businesses or organizations with limited resources. Upfront investments in hardware, software, and infrastructure, as well as ongoing costs for maintenance and support, can be a barrier to adoption.
- Accessibility: Some users, particularly older adults or those with disabilities, may have difficulty using smart mobile devices or navigating complex interfaces. This can limit the accessibility and inclusiveness of these systems.
- Dependence on Smart Mobile Devices: Relying on smart mobile devices for validation and access control can be problematic if a user's device is lost, stolen, or has a dead battery. In these cases, alternative methods of validation or access may be required, potentially complicating the system.

Despite these challenges, continued advancements in technology and integrating multiple functions into a single, user-friendly system can help address many of these drawbacks and improve the overall performance and utility of wireless validation systems.

The following detailed description of the invention provides an in-depth understanding of the system's components, functionality, and operation and the multi-functional wireless communication device for access control and ticket validation.

Multi-Functional Wireless Communication Device

The multi-functional wireless communication device (100) is a compact, robust device that combines multiple ticket validation and access control functionalities. The device is enclosed in a durable housing (101), designed to withstand daily wear and tear:

- Processing Unit (102): The device (100) contains a processing unit (102) responsible for executing operations, managing communication with external devices, and handling user inputs.
- Communication Modules (103): The device (100) is equipped with multiple communication modules, including Bluetooth (103*a*), NFC (103*b*), RF (103*c*), and UWB (103*d*), to enable wireless communication with terminals (300) and other compatible devices.
- Secure Element (104): The device (100) contains a secure element, which securely stores sensitive user data, such as identification and balance information, and ensures the integrity of the data during communication with external devices.
- Haptic Element (105): A haptic element is incorporated within the device (100) to provide tactile feedback to the user, such as vibrations during successful or unsuccessful validation or access control operations.
- Protected Flash Memory (106): The device (100) includes protected flash memory for storing firmware, user settings, and other essential data, ensuring that the data is preserved even when powered off.
- Speaker (107): A built-in speaker allows the device (100) to provide audible feedback to the user, such as beeps or tones during successful or unsuccessful validation or access control operations.
- Visualization element (108): An LED serves as a visual indicator for the user, signaling the device's (100) status, such as successful or unsuccessful validation or access control operations, battery level, and communication status.
- Battery (109): A battery powers the device (100), providing enough energy for daily use while maintaining a compact and lightweight design. The battery may be rechargeable or replaceable, depending on the specific implementation.
- Button (110): A user-activated button on the device (100) initiates validation or access control operations. The button may be designed to be easily accessible and responsive to user input.

System Components

The multi-functional wireless communication device (100) operates within a system that includes a backend system (200), terminals (300), and a mobile application (401) on a smart mobile device (400):

- Backend System (200): The backend system is responsible for processing validation and access control requests in real time (201), verifying the authenticity of the requests, and maintaining user data and system settings. Depending on the specific implementation, the backend system may be hosted on a cloud or a local server.

Terminal (300): Terminals are external devices connected to the backend system (200) via (201) and communicate with the multi-functional wireless communication device (100) for ticket validation and/or access control. The type of communication depends on the application's needs and requirements (Bluetooth, RF, or UWB). These devices (300) may be installed in the buses at access points, such as public transportation entry gates, parking ramps, or garage doors.

Mobile Application (401): A mobile application on a smart mobile device (400) connects to the backend system (200) via (202) and enables users to manage the multi-functional wireless communication devices (100) settings and balance. The mobile application (401) may allow users to top-up their balance, update device parameters, and view transaction history, among other features.

System Operation

The multi-functional wireless communication device (100) and the system operate together to enable seamless and secure ticket validation and access control processes:

Online Mode: In online mode, the multi-functional wireless communication device (100) communicates with the terminal (300) to authenticate and execute validation or access control requests. The user initiates the process by pressing the button (110) on the device (100), which sends a packet of information to the terminal (300) using Bluetooth (103*a*), RF (103*c*), or UWB (103*d*). The terminal (300) forwards the information to the backend system (200) via (201) for verification. If the information is verified, the backend system (200) sends a response to the terminal (300) via (201), which communicates the result to the multi-functional wireless communication device (100). The device (100) provides haptic (105), audible (107), or visual (108) feedback to the user based on the response received from the backend system (200).

Offline Mode: In offline mode, the system enables ticket validation and access control without communication with the backend system (200). Instead, the terminal (300) and the multi-functional wireless communication device (100) rely on synchronized data stored within their respective secure elements (104). When the user initiates a validation or access control request, the terminal (300) verifies the request using the stored data and communicates the result to the multi-functional wireless communication device (100), which provides feedback to the user accordingly.

Mobile Application (401): The mobile application plays a crucial role in managing the multi-functional wireless communication device's (100) settings and balance. Users can use the application to top-up their balance, update device parameters and view transaction history. The mobile application (401) communicates with the backend system (200) via (202) to synchronize data and update the device's (100) secure element (104) via NFC (103*b*).

Additional Features

The system and the multi-functional wireless communication device (100) may include additional features and enhancements to improve functionality, security, and usability:

Motion and Orientation Detection: The device (100) may incorporate motion and orientation detection capabilities, enabling gesture-based controls or automatic activation of the device (100) when in proximity to a terminal (300).

Usage History Tracking: The system may track usage history, providing users with a detailed record of their validation and access control activities.

Administrator Interface: A secure administrator interface may be provided for managing the backend system (200), allowing authorized personnel to monitor system performance, update settings, and collect user data.

Secure Communication: The system may employ encryption and other security measures to ensure the confidentiality and integrity of data during communication between the multi-functional wireless communication device (100), terminals (300), and the backend system (200).

Multiple User Profiles: The device (100) may support multiple user profiles, allowing different users to share a single device for ticket validation and access control.

Tamper-Detection Mechanisms: Tamper-detection mechanisms may be incorporated within the device (100) to detect and respond to attempts to compromise the device's integrity or functionality.

Over-the-Air Firmware Updates: The system may support over-the-air firmware updates, enabling users to update their multi-functional wireless communication devices (100) remotely without needing physical intervention.

Adaptive Communication Protocols: The device (100) may be designed to adaptively select the most suitable communication protocol (Bluetooth (103*a*), RF (103*c*), or UWB (103*d*)) based on factors such as signal strength, power consumption, and user preferences.

Waterproof Housing (101): The device (100) housing may be designed to be waterproof (e.g. having "ingress protection code" IP65 or better), providing additional protection against environmental factors and ensuring the device's durability.

By providing a robust, versatile, user-friendly, easy-to-use, and cost-effective solution for ticket validation and access control, the multi-functional wireless communication device and the accompanying system streamline the user experience, reduce the need for multiple devices or cards and improve overall system efficiency. The multi-functional wireless communication device and the system can be adapted to various applications, such as public transportation, parking, and garage door opening, offering a streamlined and convenient user experience.

The invention claimed is:

1. A system for validating tickets and controlling access using a multi-functional wireless communication device for access control and ticket validation, comprising:

a. a housing;

b. a processing unit for managing the operations and functionalities of the device;

c. communication modules, including Bluetooth, NFC, RF, and UWB modules for wireless communication with various external devices, such as terminals and access control systems;

d. a secure element for securely storing sensitive information and cryptographic keys;

e. a haptic element for providing user feedback during device operation;

f. protected flash memory for storing data and device settings;

g. a speaker for outputting audible feedback;

h. a visualization element for providing visual feedback;

i. a battery for providing power to the device;

j. a button for initiating ticket validation or access control operations;

k. a backend system for processing validations and access control requests in real time;

l. a terminal connected to the backend system for verifying the authenticity of the validation or access control requests received from the multi-functional wireless communication device; and m. a mobile application on a smart mobile device connected to the backend system allows users to top-up or change parameters on the multi-functional wireless communication device via NFC.

2. The system of claim 1, wherein the multi-functional wireless communication device communicates with the terminal using Bluetooth, RF, or UWB, depending on the requirements of the specific application.

3. The system of claim 1, wherein the terminal forwards the received information from the multi-functional wireless communication device to the backend system for identification, authentication, and feasibility verification.

4. The system of claim 1, wherein the backend system returns an approval or denial response to the terminal based on the matching of provided data, such as enough balance, registration, or prepaid user status.

5. The system of claim 1, capable operating in an offline mode, wherein communication with the backend system is not necessary, and all required data is securely stored within the terminal and the multi-functional wireless communication device, which is synchronized.

6. The system of claim 1, wherein the backend system maintains a history of validation and access control transactions for each multi-functional wireless communication device, enabling tracking of usage patterns and facilitating data analysis for improving system efficiency and user experience.

7. The system of claim 1, further comprising an administrator interface for managing the backend system, including adding or updating terminals and access control points, as well as monitoring the status of connected devices and overall system performance.

8. The system of claim 1, wherein the mobile application allow users to manage multiple multi-functional wireless communication devices, each associated with different user profiles or access control permissions.

9. The system of claim 1, wherein the backend system support over-the-air updates to the firmware of the multi-functional wireless communication device, allowing for remote maintenance and feature enhancements.

10. A method of ticket validation and access control using the system of claim 1, comprising the steps:

a. pressing a button on the multi-functional wireless communication device to initiate ticket validation or access control, b. transmitting a packet of information from the multi-functional wireless communication device to the terminal via Bluetooth, RF, or UWB, c. forwarding the packet of information from the terminal to the backend system for verification, d. receiving a response from the backend system to the terminal indicating approval or denial of the validation or access control request, e. providing feedback to the user via the multi-functional wireless communication device, including haptic, audible, or visual feedback, based on the response received from the backend system.

11. The method of claim 10, wherein the system operates in an offline mode, allowing for ticket validation and access control without communication with the backend system, based on the synchronized data stored within the terminal and the multi-functional wireless communication device.

12. The method of claim 10, further comprising a step of encrypting the packet of information transmitted between the multi-functional wireless communication device and the terminal, ensuring secure communication and protecting sensitive user data.

13. The system of claim 1, further comprising an API for third-party developers to integrate the ticket validation and access control functionality into their applications or systems.

* * * * *